(12) United States Patent
Lei et al.

(10) Patent No.: US 7,110,937 B1
(45) Date of Patent: Sep. 19, 2006

(54) TRANSLATION LEVERAGING

(75) Inventors: Shu Lei, San Mateo, CA (US); Sergey Parievsky, Palo Alto, CA (US); Mark Hastings, Palo Alto, CA (US)

(73) Assignee: Siebel Systems, Inc., San Mateo, CA (US)

( * ) Notice: Subject to any disclaimer, the term of this patent is extended or adjusted under 35 U.S.C. 154(b) by 714 days.

(21) Appl. No.: 10/177,876

(22) Filed: Jun. 20, 2002

(51) Int. Cl.
*G06F 17/28* (2006.01)

(52) U.S. Cl. .................. 704/2; 704/10; 704/8

(58) Field of Classification Search ............ 704/2; 715/703
See application file for complete search history.

(56) References Cited

U.S. PATENT DOCUMENTS 5,416,903 A * 5/1995 Malcolm .............. 715/703
5,678,039 A * 10/1997 Hinks et al. .............. 707/4
6,345,243 B1 * 2/2002 Clark ....................... 704/2
6,345,244 B1 * 2/2002 Clark ....................... 704/2

* cited by examiner

Primary Examiner—V. Paul Harper
(74) Attorney, Agent, or Firm—Campbell Stephenson Ascolese LLP

(57) ABSTRACT

An application archive is searched for an existing translation for a text string in an application to be localized. The text string is associated with context information that identifies a location of the text string in the application. If an existing translation is found that matches the text string, and all, or alternately part of, the context information, the existing translation is logically linked to the text string. In one aspect, the existing translation is selected from multiple matches based on number of occurrences. In another aspect, the existing translation is submitted to a manual validation process.

27 Claims, 4 Drawing Sheets

US 7,110,937 B1

TRANSLATION LEVERAGING

FIELD OF THE INVENTION

This invention relates generally to localization of computer-based applications, and more particularly to translating application terminology into local languages.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2001, Siebel Systems, Inc., All Rights Reserved.

BACKGROUND OF THE INVENTION

Interactive computer applications typically use pre-defined text, such as titles, captions, and the like, to guide a user through the applications. The pre-defined text is written in a human language, usually the native language of the country of the developer or a common language, such as English. When the application is destined for use in other countries, typically the text is manually translated into the various local languages as part of a process commonly referred to as "localization." Because localization must be performed for each new version of the application, the cost of localizing an application into many languages can be very high. Previous translations may be reused but may not be accurate, particularly if multiple translations for the same text exist.

SUMMARY OF THE INVENTION

An application archive is searched for an existing translation for a text string in an application to be localized. The text string is associated with context information that identifies a location of the text string in the application. If an existing translation is found that matches the text string, and all, or alternately part of, the context information, the existing translation is logically linked to the text string. In one aspect, the existing translation is selected from multiple matches based on number of occurrences. In another aspect, the existing translation is submitted to a manual validation process.

The present invention describes systems, clients, servers, methods, and machine-readable media of varying scope. In addition to the aspects of the present invention described in this summary, further aspects of the invention will become apparent by reference to the drawings and by reading the detailed description that follows.

DETAILED DESCRIPTION OF THE INVENTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

Figure 1:
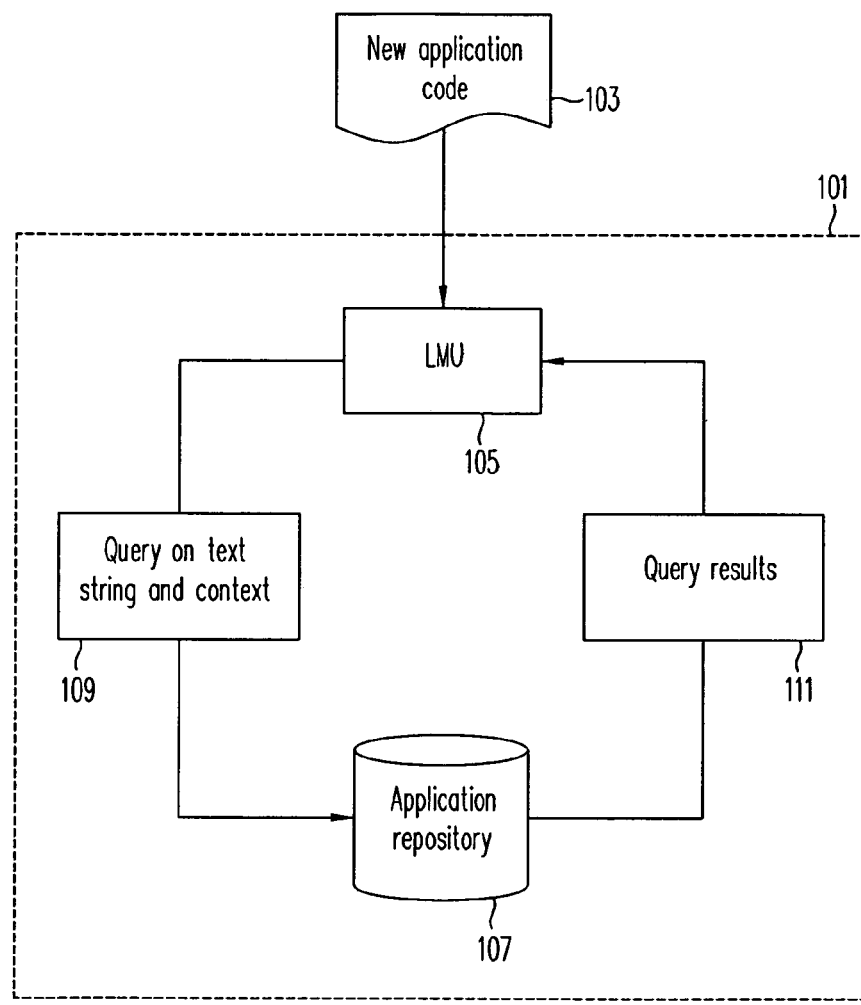
FIG. 1 is a diagram illustrating a system-level overview of an embodiment of the invention.

A system level overview of the operation of an embodiment of a localization leveraging system 101 that facilitates the localization of text strings within computer-based applications is described by reference to FIG. 1A. An application archive, illustrated as repository 107, holds metadata for one or more versions of an application. The metadata includes pre-defined text that is presented to a user by the application, such as through a graphical user interface. The pre-defined text may be titles, words on buttons and other types of controls presented on a screen, captions that describe information to be entered, etc. The text may consist of a single word, a phrase, or a set of phrases, all of which are referred to herein as "text strings." When the application is localized for shipment to different countries, the text strings are translated from their source language to one or more target languages. The translations are stored in the repository 107 and logically linked to the text strings. In one embodiment, the metadata includes context information that uniquely identifies the location of the text strings in the application, such as the particular control on which the text string appears, and each text string in the repository 107 is associated with its stored context information.

When new application code 103 is to be localized for a target language, a localization management utility (LMU) 105 extracts the text strings and context information from the new application code 103 and sends a query 109 to the repository 107 to determine if each text strings in its particular context has been previously translated into the target language. The query results 111 contains one or more translations in the target language, if they exist in the repository 107, and the LMU 105 logically links the most appropriate translation with the text string. A particular algorithm that determines the most appropriate translation is described further below in conjunction with FIG. 2.

If a translation does not exist in the repository, the LMU 105 marks the text string for translation. The process required to translate the text string is not germane to the understanding of the present invention and is not described further.

The application repository 107 may be based on a proprietary storage structure or be a component in a publicly available change control system, such as RCS (revision control system) or CVS (concurrent versions system). In one embodiment, the application repository 107 is a relational database, with the text strings, translations, and context information stored as records. The LMU 105 constructs the query 109 against these records using a sequential query language. It will be appreciated that the application code 103 may be stored in the repository 107 in addition to the metadata.

Figure 2:
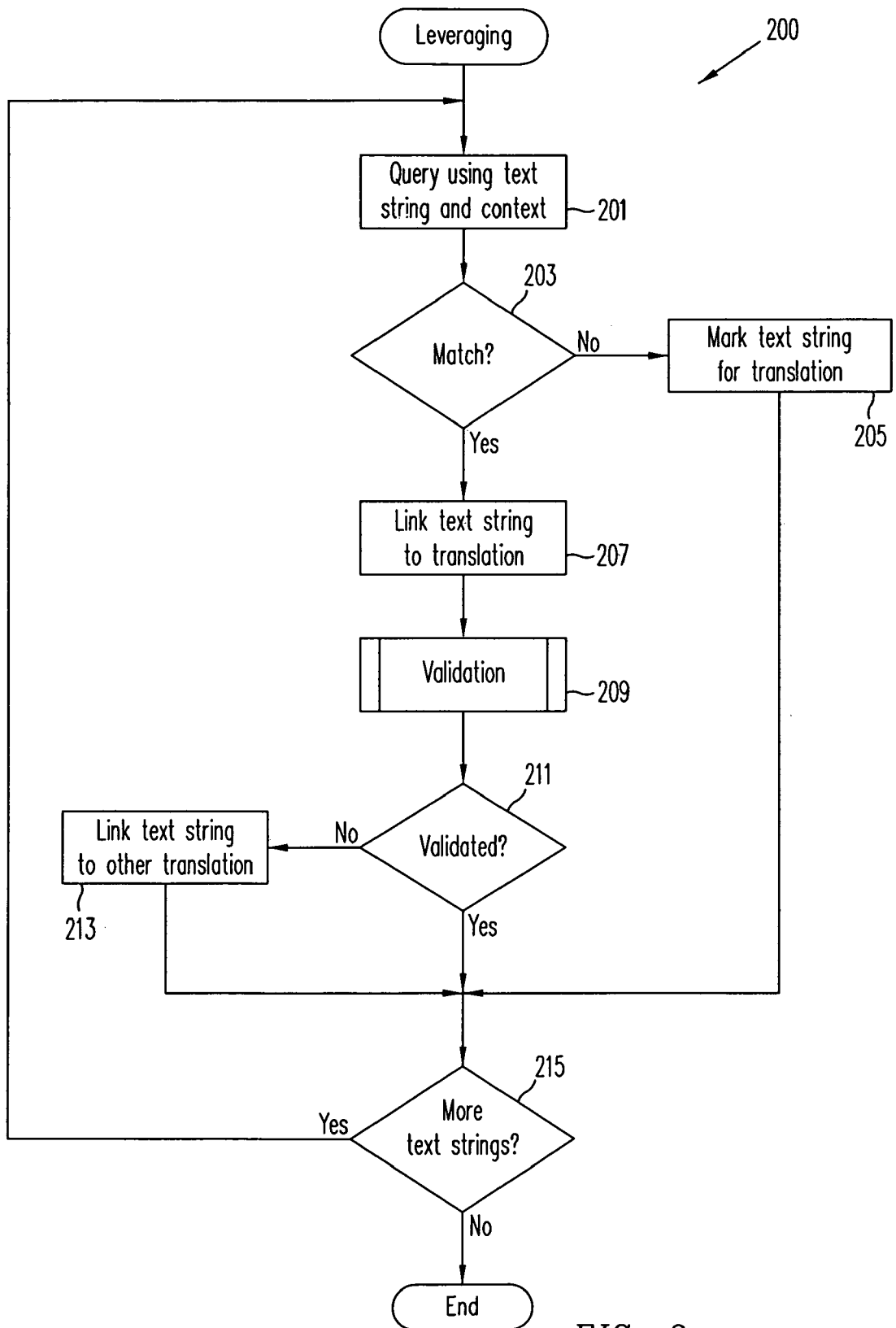
FIG. 2 is a flowchart of a method to be performed by the embodiment of FIG. 1A.

One embodiment of a leveraging method 200 performed by the LMU 105 is described with reference to flowchart shown in FIG. 2. For each text string to be translated, the method 200 queries the repository using the text string and its context information (block 201). If no appropriate match is found (block 203), the method 200 marks the text string for translation (block 205). If an appropriate match is found, the method 200 links the text string to the found translation (block 207).

The text string, context, and found translation are submitted to a manual validation process represented by block 209. If the validation process determines the found translation is not appropriate (block 213), an alternate translation selected by the validation process is linked to the text string at block 213. If the translation is validated, the method 200 determines if more text strings should be processed (block 215) and returns to block 201 if so.

In one embodiment, the processing at block 203 incorporates an algorithm that allows for multiple matches, including inexact context matches. Assuming multiple translations match the text string and context information, the method 200 selects the translation with the most occurrences as the appropriate translation. If translations exist for the text string but the context information is not exactly matched, the method 200 selects the translation with the most occurrences from a set of translations that inexactly match the context information. For example, the context information for a text string on a control would include identifiers for the application, the screen or view, and the control. If an exact match is not found on all three identifiers, the method 200 would select a translation from those with context information matching the application and view identifiers. If an exact match is not found for the application and view identifiers, the method 200 would select a translation from those with context information that match the application identifier. If an exact match is not found for the application identifier, the method 200 would determine that no match exists and proceed to block 205. It will be appreciated that the context information may include more or less information than that used in the example, and that some text strings may be uniquely defined by less context information than others.

An alternate embodiment of method 200 may be used when multiple translations are returned by the query at block 203. In this case, the method 200 proceeds immediately to block 209, where it presents the list to the user. If the user selects one of the translations, the linking process at block 207 is performed. Otherwise, the user will input the appropriate translation and it will be linked at block 213 as described above.

In practice, the leveraging method 200 may constitute one or more programs made up of machine-executable instructions. Describing the method with reference to the flowchart in FIG. 2 enables one skilled in the art to develop such programs, including such instructions to carry out the operations (acts) represented by logical blocks 201 until 215 on suitably configured machines (the processor of the machine executing the instructions from machine-readable media). The machine-executable instructions may be written in a computer programming language or may be embodied in firmware logic. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a machine causes the processor of the machine to perform an action or produce a result. It will be further appreciated that more or fewer processes may be incorporated into the method illustrated in FIG. 2 without departing from the scope of the invention and that no particular order is implied by the arrangement of blocks shown and described herein.

Figure 3A:
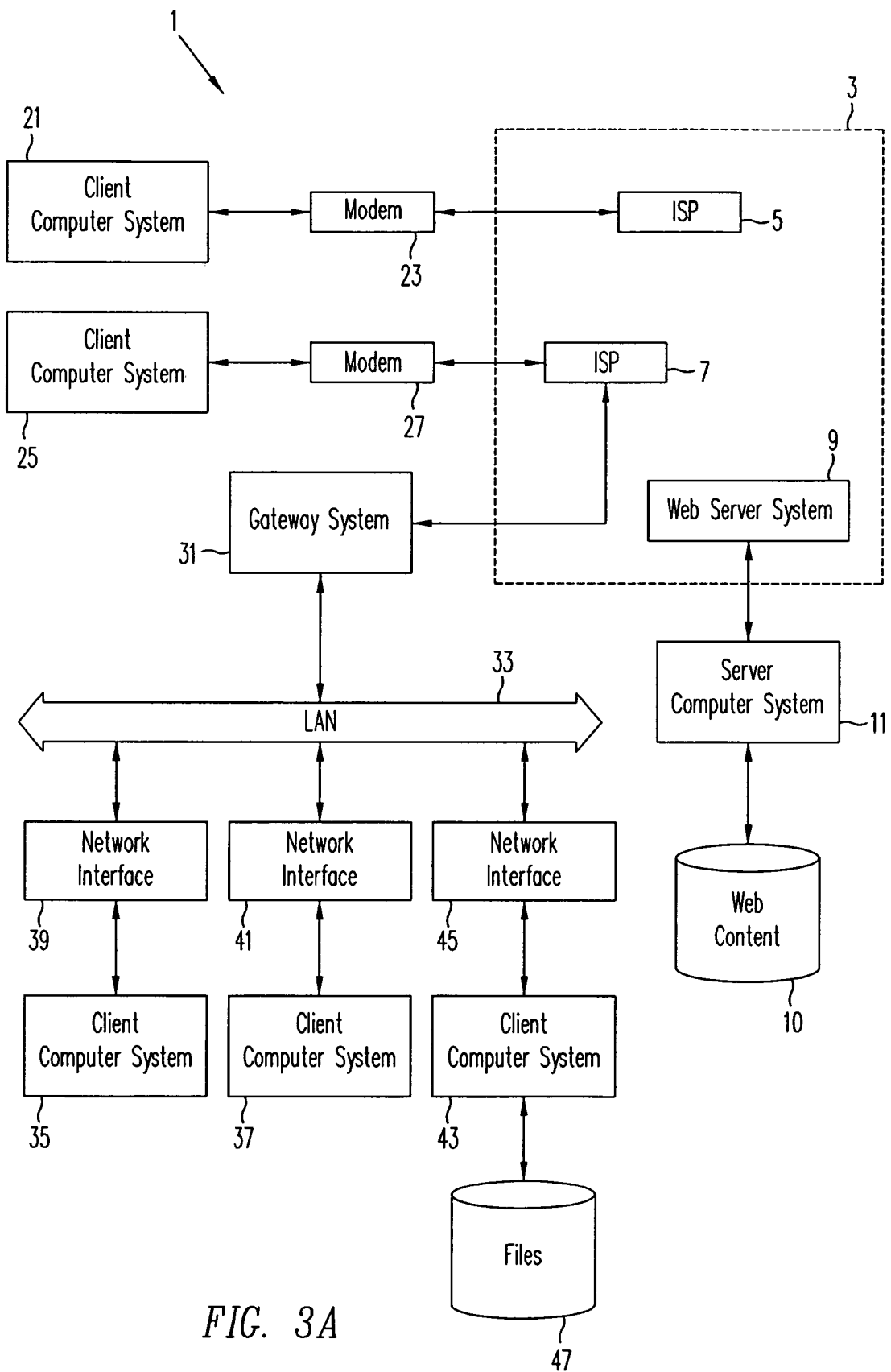
FIG. 3A is a diagram of one embodiment of an operating environment suitable for practicing the present invention.
Figure 3B:
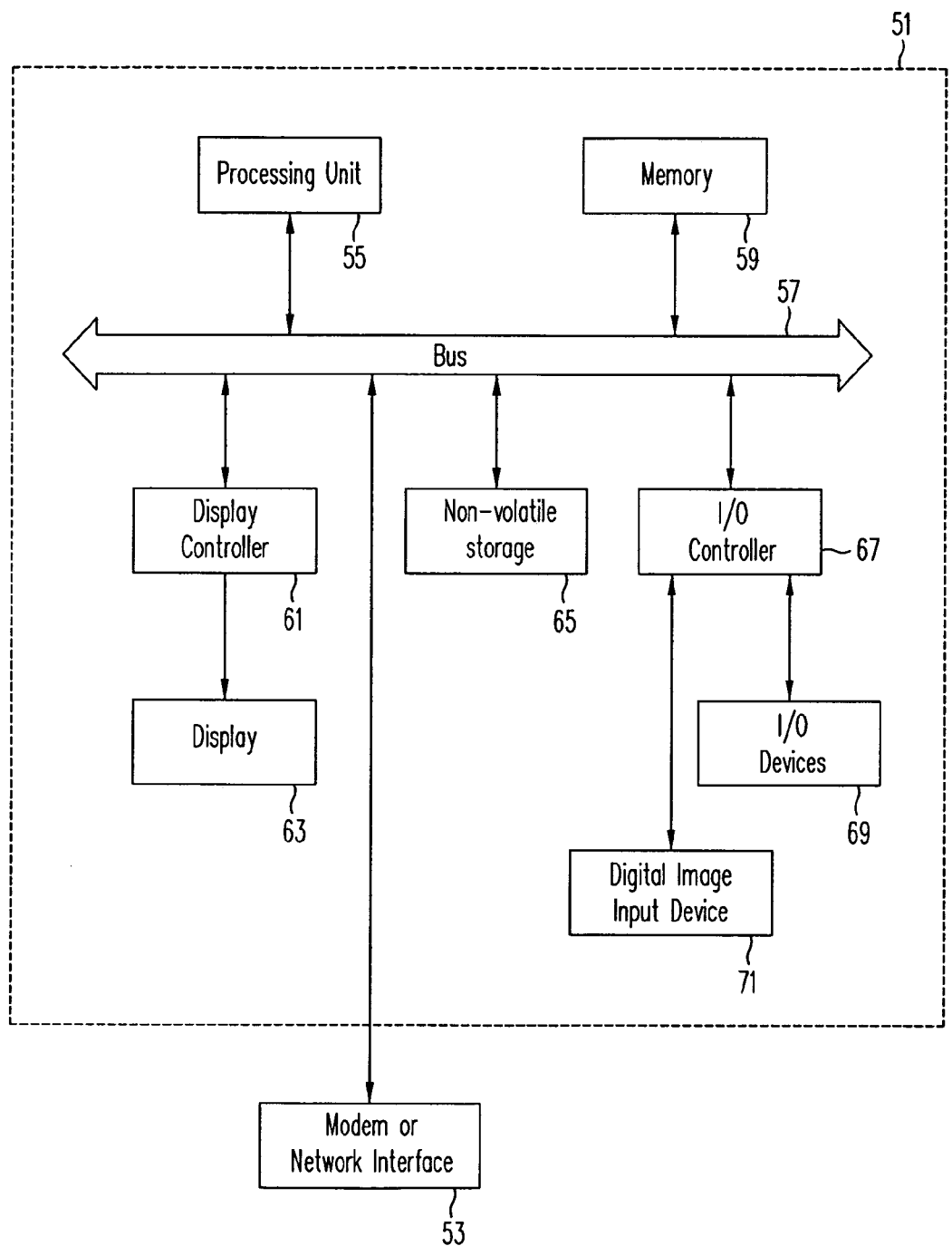
FIG. 3B is a diagram of one embodiment of a computer system suitable for use in the operating environment of FIG. 3A.

The following description of FIGS. 3A–B is intended to provide an overview of computer hardware and other operating components suitable for implementing the visual context translation system, but is not intended to limit the applicable environments. One of skill in the art will immediately appreciate that the invention can be practiced with other computer system configurations, including hand-held devices, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network.

FIG. 3A shows several computer systems 1 that are coupled together through a network 3, such as the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet are well known to those of skill in the art. Access to the Internet 3 is typically provided by Internet service providers (ISP), such as the ISPs 5 and 7. Users on client systems, such as client computer systems 21, 25, 35, and 37 obtain access to the Internet through the Internet service providers, such as ISPs 5 and 7. Access to the Internet allows users of the client computer systems to exchange information, receive and send e-mails, and view documents, such as documents which have been prepared in the HTML format. These documents are often provided by web servers, such as web server 9 which is considered to be "on" the Internet. Often these web servers are provided by the ISPs, such as ISP 5, although a computer system can be set up and connected to the Internet without that system being also an ISP as is well known in the art.

The web server 9 is typically at least one computer system which operates as a server computer system and is configured to operate with the protocols of the World Wide Web and is coupled to the Internet. Optionally, the web server 9 can be part of an ISP which provides access to the Internet for client systems. The web server 9 is shown coupled to the server computer system 11 which itself is coupled to web content 10, which can be considered a form of a media database. It will be appreciated that while two computer systems 9 and 11 are shown in FIG. 3A, the web server system 9 and the server computer system 11 can be one computer system having different software components providing the web server functionality and the server functionality provided by the server computer system 11 which will be described further below.

Client computer systems 21, 25, 35, and 37 can each, with the appropriate web browsing software, view HTML pages provided by the web server 9. The ISP 5 provides Internet connectivity to the client computer system 21 through the modem interface 23 which can be considered part of the client computer system 21. The client computer system can be a personal computer system, a network computer, a Web TV system, or other such computer system. Similarly, the ISP 7 provides Internet connectivity for client systems 25, 35, and 37, although as shown in FIG. 3A, the connections are not the same for these three computer systems. Client computer system 25 is coupled through a modem interface 27 while client computer systems 35 and 37 are part of a LAN. While FIG. 3A shows the interfaces 23 and 27 as generically as a "modem," it will be appreciated that each of these interfaces can be an analog modem, ISDN modem, cable modem, satellite transmission interface (e.g. "Direct PC"), or other interfaces for coupling a computer system to other computer systems. Client computer systems 35 and 37 are coupled to a LAN 33 through network interfaces 39 and 41, which can be Ethernet network or other network interfaces. The LAN 33 is also coupled to a gateway computer system 31 which can provide firewall and other Internet related services for the local area network. This gateway computer system 31 is coupled to the ISP 7 to provide Internet connectivity to the client computer systems 35 and 37. The gateway computer system 31 can be a conventional server computer system. Also, the web server system 9 can be a conventional server computer system.

Alternatively, as well-known, a server computer system 43 can be directly coupled to the LAN 33 through a network interface 45 to provide files 47 and other services to the clients 35, 37, without the need to connect to the Internet through the gateway system 31.

FIG. 3B shows one example of a conventional computer system that can be used as a client computer system or a server computer system or as a web server system. It will also be appreciated that such a computer system can be used to perform many of the functions of an Internet service provider, such as ISP 5. The computer system 51 interfaces to external systems through the modem or network interface 53. It will be appreciated that the modem or network interface 53 can be considered to be part of the computer system 51. This interface 53 can be an analog modem, ISDN modem, cable modem, token ring interface, satellite transmission interface (e.g. "Direct PC"), or other interfaces for coupling a computer system to other computer systems. The computer system 51 includes a processing unit 55, which can be a conventional microprocessor such as an Intel Pentium microprocessor or Motorola Power PC microprocessor. Memory 59 is coupled to the processing unit 55 by a bus 57. Memory 59 can be dynamic random access memory (DRAM) and can also include static RAM (SRAM). The bus 57 couples the processing unit 55 to the memory 59 and also to non-volatile storage 65 and to display controller 61 and to the input/output (I/O) controller 67. The display controller 61 controls in the conventional manner a display on a display device 63 which can be a cathode ray tube (CRT) or liquid crystal display (LCD). The input/output devices 69 can include a keyboard, disk drives, printers, a scanner, and other input and output devices, including a mouse or other pointing device. The display controller 61 and the I/O controller 67 can be implemented with conventional well known technology. A digital image input device 71 can be a digital camera which is coupled to an I/O controller 67 in order to allow images from the digital camera to be input into the computer system 51. The non-volatile storage 65 is often a magnetic hard disk, an optical disk, or another form of storage for large amounts of data. Some of this data is often written, by a direct memory access process, into memory 59 during execution of software in the computer system 51. One of skill in the art will immediately recognize that the terms "computer-readable medium" and "machine-readable medium" includes any type of storage device that is accessible by the processing unit 55 and also encompasses a carrier wave that encodes a data signal.

It will be appreciated that the computer system 51 is one example of many possible computer systems which have different architectures. For example, personal computers based on an Intel microprocessor often have multiple buses, one of which can be an input/output (I/O) bus for the peripherals and one that directly connects the processing unit 55 and the memory 59 (often referred to as a memory bus). The buses are connected together through bridge components that perform any necessary translation due to differing bus protocols.

Network computers are another type of computer system that can be used with the present invention. Network computers do not usually include a hard disk or other mass storage, and the executable programs are loaded from a network connection into the memory 59 for execution by the processing unit 55. A Web TV system, which is known in the art, is also considered to be a computer system according to the present invention, but it may lack some of the features shown in FIG. 3B, such as certain input or output devices. A typical computer system will usually include at least a processor, memory, and a bus coupling the memory to the processor.

It will also be appreciated that the computer system 51 is controlled by operating system software which includes a file management system, such as a disk operating system, which is part of the operating system software. One example of an operating system software with its associated file management system software is the family of operating systems known as Windows® from Microsoft Corporation of Redmond, Wash., and their associated file management systems. The file management system is typically stored in the non-volatile storage 65 and causes the processing unit 55 to execute the various acts required by the operating system to input and output data and to store data in memory, including storing files on the non-volatile storage 65.

The reuse of existing translations when localizing a computer-based application has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. For example, the invention is suitable for use with any commercially available code repository that allows the storage of textual information and for use with the query facilities provided for such repositories.

The terminology used in this application with respect to files is meant to include all types of data storage environments, including flat files, relational databases, indexed files, linked lists, and the like. Therefore, it is manifestly intended that this invention be limited only by the following claims and equivalents thereof.

What is claimed is:

1. A computerized method of leveraging existing translations for localization of applications comprising:

extracting a first text string to be translated and context information that identifies the location of the first text string in a first application to be translated;

searching an application archive for an existing translation in a target language for the first text string using metadata pertaining to a second text string that has been previously translated, the existing translation logically linked to the second text string, and context information that identifies the location of the second text string in a second application that has been previously translated; and linking the first text string with the existing translation if the context information of the first text string corresponds to the context information of the second text string.

2. The computerized method of claim 1 further comprising:

selecting the existing translation from a set of translations found in the application archive.

3. The computerized method of claim 2, wherein the selecting is based on a number of occurrences of each of the translations.

4. The computerized method of claim 2, wherein each translation in the set of translations is associated with context information that matches all the context information for the first text string.

5. The computerized method of claim 2, wherein each translation in the set of translations is associated with context information that matches part of the context information for the first text string.

6. The computerized method of claim 1 further comprising:

sending an existing translation to a validation process; and
linking the first text string with the existing translation if the existing translation is validated.

7. The computerized method of claim 6 further comprising:

linking the first text string with an alternate translation from the validation process if the existing translation is not validated.

8. The computerized method of claim 1 further comprising:

presenting a list of existing translations to a user for selection; and
linking the first text string with the existing translation selected by the user.

9. The computerized method of claim 1, wherein the first text string is the same as the second text string.

10. A machine-readable medium having executable instructions to cause a machine to perform a method comprising:

extracting a first text string and context information that identifies the location of the first text string in a first application to be translated;

searching an application archive for an existing translation in a target language for the first text string using metadata pertaining to a second text string that has been previously translated, the existing translation logically linked to the second text string, and context information that identifies the location of the second text string in a second application that has been previously translated; and linking the first text string with the existing translation if the context information of the first text string corresponds to the context information of the second text string.

11. The machine-readable medium of claim 10, wherein the method further comprises:

selecting the existing translation from a set of translations found in the application archive.

12. The machine-readable medium of claim 11, wherein the selecting is based on a number of occurrences of each of the translations.

13. The machine-readable medium of claim 11, wherein each translation in the set of translations is associated with context information that matches all the context information for the first text string.

14. The machine-readable medium of claim 11, wherein each translation in the set of translations is associated with context information that matches part of the context information for the first text string.

15. The machine-readable medium of claim 10, wherein the method further comprises:

sending an existing translation to a validation process; and
linking the first text string with the existing translation if the existing translation is validated.

16. The machine-readable medium of claim 15, wherein the method further comprises:

linking the first text string with an alternate translation from the validation process if the existing translation is not validated.

17. The machine-readable medium of claim 10, wherein the method further comprises:

presenting a list of existing translations to a user for selection; and
linking the first text string with the existing translation selected by the user.

18. The machine-readable medium of claim 10, wherein the first text string is the same as the second text string.

19. A system comprising:

a processor coupled to a memory through a bus; and
a translation leveraging process executed from the memory by the processor to cause the processor to:
extract a first text string and context information that identifies the location of the first text string in a first application to be translated;
search an application archive for an existing translation in a target language for the first text string using metadata pertaining to a second text string, the existing translation logically linked to the second text string, and context information that identifies the location of the second text string in a second application that has been previously translated; and
link the first text string with an existing translation if the context information of the first text string corresponds to the context information of the second text string.

20. The system of claim 19, wherein the translation leveraging process further causes the processor to select the existing translation from a set of translations found in the application archive.

21. The system of claim 20, wherein the translation leveraging process further causes the processor to select the existing translation based on a number of occurrences of each of the translations.

22. The system of claim 20, wherein each translation in the set of translations is associated with context information that matches all the context information for the first text string.

23. The system of claim 20, wherein each translation in the set of translations is associated with context information that matches part of the context information for the first text string.

24. The system of claim 19, wherein the translation leveraging process further causes the processor to send an existing translation to a validation process, and link the first text string with the existing translation if the existing translation is validated.

25. The system of claim 24, wherein the translation leveraging process further causes the processor to link the first text string with an alternate translation from the validation process if the existing translation is not validated.

26. The system of claim 19, wherein the translation leveraging process further causes the processor to present a list of existing translations to a user for selection, and link the first text string with the existing translation selected by the user.

27. The system of claim 19, wherein the first text string is the same as the second text string.

* * * * *